Sept. 11, 1962  E. A. BARNES ET AL  3,053,003
AUDIBLE SIGNAL DEVICE FOR FISHING POLES
Filed Sept. 30, 1960
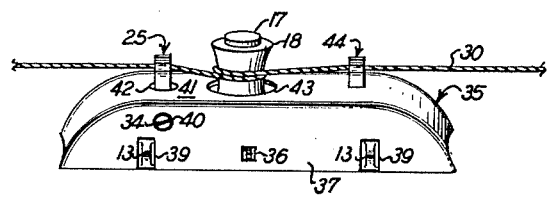
Fig. 1
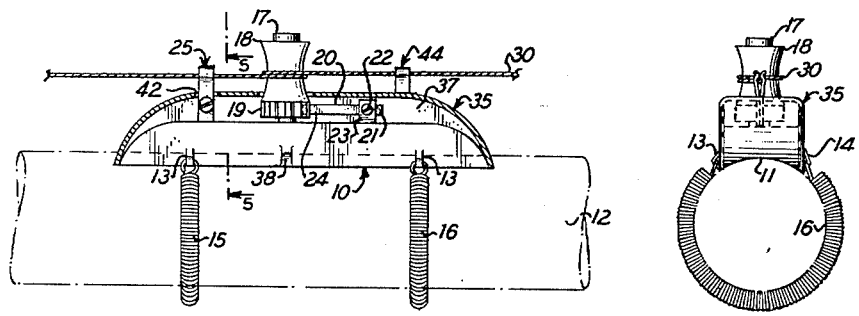
Fig. 2
Fig. 3
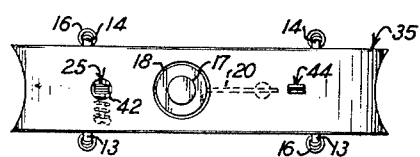
Fig. 4
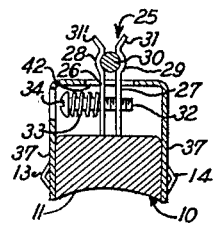
Fig. 5
INVENTORS
EMMETT A. BARNES
ROBERT B. WITHINGTON
BY Jacobi & Jacobi
ATTORNEYS

United States Patent Office 3,053,003
Patented Sept. 11, 1962

3,053,003
AUDIBLE SIGNAL DEVICE FOR FISHING POLES
Emmett A. Barnes and Robert B. Withington, both of 3816 Reading Road, Cincinnati 29, Ohio
Filed Sept. 30, 1960, Ser. No. 59,595
9 Claims. (Cl. 43—17)

This invention relates to fishing equipment and more particularly to an audible signal device intended to be detachably mounted on a fishing pole and to provide an audible signal in the event of a strike or a fish taking the hook and once the device has served its purpose, the same will not in any way interfere with the normal manipulation of the rod or reel and also when desired, the device may be removed and the rod and reel utilized in a normal manner.

Heretofore many different types of signal devices, both audible and visual have been proposed and utilized for fishing operations, but many of these are complete devices intended for mounting on a fishing pole and the majority of these devices are relatively complex and consequently require an additional investment on the part of the fisherman considerably greater than would be required for a simple device adapted for mounting on a fishing pole to provide an audible signal. Visual signal devices have been utilized on fishing poles, but these are not as convenient as audible signals, in that where several poles are utilized simultaneously, the fisherman is required to attempt to watch all of these poles and this becomes rather tiring, whereas with an audible signal, it is only necessary to listen for such signal and thereafter grasp the appropriate fishing pole.

It is accordingly an object of the invention to provide an audible signal device for fishing poles which may be conveniently mounted on such pole or removed therefrom to permit use of the pole with or without the signal device.

A further object of the invention is the provision of an audible signal device for fishing poles in which such device may be utilized to provide a signal and thereafter rendered inoperative to permit normal manipulation and use of the fishing pole and reel.

A still further object of the invention is the provision of an audible signal device for fishing poles and incorporating means to adjust the tension required on the fishing line to operate the device to provide an audible signal.

Another object of the invention is the provision of an audible signal device for fishing poles which may be conveniently and economically manufactured from readily available materials and applied to fishing poles without modification thereof, the device being particularly adapted for use with spinning reels, but the same may also be utilized with other types of reels.

Further objects and advantages of the invention will be apparent from the following description taken in conjunction with the accompanying drawing wherein:

FIG. 1 is a side elevational view of an audible signal device constructed in accordance with this invention and showing the manner in which a fishing line is applied thereto;

FIG. 2 is a side elevational view with parts broken away and in section to show the internal structure of the device and also showing the device mounted on a fishing pole;

FIG. 3 is an end elevational view of the device shown in FIG. 2;

FIG. 4 is a top plan view of the signal device of this invention; and

FIG. 5 is a sectional view taken substantially on the line 5—5 of FIG. 2 and showing the means for adjusting lines tension.

With continued reference to the drawing, there is shown an audible signal device for fishing poles constructed in accordance with this invention and which may well comprise an elongated base 10 generally rectangular in cross section and formed of wood, plastic, metal or any other suitable material. The base 10 is provided with a longitudinally extending concave groove 11 in the bottom thereof to provide a seat for a fishing pole 12 and in order to secure the base 10 to the fishing pole 12, the base 10 may be provided on opposite sides thereof with loops 13 and 14 which serve to receive the ends of coil springs 15 and 16 extending around the pole 12 to secure the base 10 thereto. While coil springs 15 and 16 are shown for this purpose, it is to be understood that this is for illustrative purposes only and that other types of resilient members, such as strips of rubber or other elastic material may also be utilized for this purpose.

An upwardly extending spindle 17 is rotatably mounted on the base 10 intermediate the length thereof and the spindle 17 is provided with a spool portion 18 and adjacent the lower end the spindle 17 is provided with ratchet teeth 19. A leaf spring 20 is secured at one end 21 by screw threaded fastening means or the like 22 to a bracket 23 mounted on the base 10 and the opposite end 24 of the spring 20 engages the ratchet teeth 19. As shown in FIG. 4, the spring 20 is substantially straight as a result of which the spindle 17 may be rotated in either direction thereby causing the end 24 of the spring 20 to snap over the ratchet teeth 19 thereby providing an audible signal.

An upwardly extending adjustable line guide 25 is mounted on the base 10 forwardly of the spindle 17 and as best shown in FIG. 5, the adjustable line guide 25 may comprise substantially parallel resilient strips of material 26 and 27 provided with opposed arcuate portions 28 and 29 for receiving a line 30 therebetween and the strips 26 and 27 terminate at their upper end in diverging portions 31 and 31' to facilitate insertion of the line 30 therebetween and into the opposed arcuate portions 28 and 29. A headed adjusting screw 32 is slidably received in an aperture in the strip 26 and threadedly engaged in an aperture in the strip 27 and a compression spring 33 disposed around the screw 32 engages the head 34 of the screw 32 and also the strip 26 of the adjustable line guide 25. As a result, adjustment of the screw 32 will result in increasing or decreasing the pressure exerted by the strips 26 and 27 on the line 30 and will consequently vary the frictional engagement and thereby the tension required to move the line 30 through the guide 25. The purpose of this adjustment will be later described.

A housing 35 may be provided for covering the base 10 and protecting the mechanism mounted thereon and the housing 35 may be made of any suitable material and as shown in FIG. 2, is in the form of a shell provided with apertures 36 in the opposite side walls 37 thereof for receiving a detent 38 on the base 10 to releasably secure the housing 35 in place over the base 10. The housing 35 is also provided with slots 39 in the side walls thereof for receiving the loops 13 and 14 on the base 10. Also provided in one side wall of the housing 35 is an aperture 40 permitting access to the head 34 of the screw 32 and the top wall 41 of the housing 35 is provided with an aperture 42 permitting passage of the line guide 25 and an aperture 43 permitting passage of the spool portion 18 of the spindle 17.

An upwardly extending releasable line guide 44 is mounted on the housing 35 rearwardly of the spindle 17 and the guide 44 is similar to the guide 25, except that no adjusting means is provided on the guide 44 for varying the frictional engagement thereof with the line 30.

In operation, the device is mounted on a fishing pole 12 as clearly shown in FIG. 2, and after making a cast the line 30 is looped around the spool portion 18 of the spindle 17 with two or three turns, and placed in the line guides 25 and 44. Prior to this, the screw 32 has been adjusted to provide the desired frictional engagement between the adjustable line guide 25 on the line 30, as a result of which a predetermined pull is required on the line 30 to move the same through the guide 25. Upon exertion of a pull on the line 30 sufficient to move the same through the guide 25, the spindle 17 will be rotated with the result that the end 24 of the spring 20 will snap over the ratchet teeth 19 thereby providing an audible signal indicating that a fish has engaged the hook. By reason of the fact that the spring 20 is substantially straight and engages the teeth 19 in substantial alignment with the axis of the spindle 17, the line 30 may be wrapped around the spool portion 18 of the spindle 17 in either direction, since with this arrangement the direction of rotation of the spindle 17 is immaterial. The spring 20 operating to provide an audible signal regardless of which direction the spindle 17 is rotated. Upon receiving an audible signal, the line 30 may be removed from guides 25 and 44 and from the spool portion 18 of the spindle 17 and thereafter the pole and reel are utilized in a normal and conventional manner to land the fish.

The device of this invention is relatively simple and economical and may be conveniently applied to conventional fishing poles and while the same is particularly useful in connection with spinning reels which do not normally have any audible means to indicate outward movement of the line, nevertheless the device may also be used with other types of reels and may be applied to a fishing pole without modification thereof or requiring the use of tools. Furthermore, the device may be constructed of unbreakable material and is relatively small, thereby permitting convenient stowage of the same in a fishing kit or in the pocket of the fisherman and the same may be mounted on a pole and be available for use in a matter of seconds.

It will be obvious to those skilled in the art that various changes may be made in the invention without departing from the spirit and scope there of and therefore the invention is not limited by that which is shown in the drawing and described in the specification, but only as indicated in the appended claims.

What is claimed is:

1. An audible signal device for fishing poles, said device comprising an elongated base generally rectangular in cross section, said base having a longitudinally extending concave groove in the bottom providing a seat for a fishing pole, coil springs secured to said base adjacent opposite ends encircling a fishing pole to releasable secure siad base thereto, an upwardly extending spindle rotatably mounted on said base intermediate the length thereof, ratchet teeth on said spindle adjacent the lower end, a leaf spring having one end fixed to said base and the opposite end engaging said teeth to provide a ratchet, an upwardly extending adjustable line guide mounted on said base forwardly of said spindle, said guide comprising spaced substantially parallel resilient strips having opposed arcuate portions for receiving a line and terminating at the upper ends in diverging portions to facilitate insertion of a line between said strips and said arcuate portions, a headed adjusting screw slidably received in an aperture in one strip and threadedly engaged in an aperture in the other strip and a compression spring disposed between the head of said screw and said one member, whereby adjustment of said screw will vary the frictional engagement of said strips with a line, a housing for said base and ratchet, said housing having apertures for receiving said spindle and guide, said housing having an aperture providing access to said adjusting screw and an upwardly extending releasable line guide mounted on said housing rearwardly of said spindle, whereby with said device mounted on a fishing pole and with a line extending through said guides and wrapped around said spindle a forward pull on the line will rotate said spindle and cause said ratchet to provide an audible signal, the adjustment of said adjustable guide determining the pull required to rotate said spindle.

2. An audible signal device for fishing poles, said device comprising an elongated base, said base having a longitudinally extending concave groove in the bottom providing a seat for a fishing pole, resilient means secured to said base adjacent opposite ends for encircling a fishing pole to releasably secure said base thereto, an upwardly extending spindle rotatably mounted on said base intermediate the length thereof, ratchet teeth on said spindle adjacent the lower end, a leaf spring having one end fixed to said base and the opposite end engaging said teeth to provide a ratchet, an upwardly extending adjustable line guide mounted on said base forwardly of said spindle, said guide comprising spaced substantially parallel resilient strips having opposed arcuate portions for receiving a line and terminating at the upper ends in diverging portions to facilitate insertion of a line between said strips and said arcuate portions, a headed adjusting screw slidably received in an aperture in one strip and threadedly engaged in an aperture in the other strip and a compression spring disposed between the head of said screw and said one member, whereby adjustment of said screw will vary the frictional engagement of said strips with a line, a housing for said base and ratchet, said housing having apertures for receiving said spindle and guide, said housing having an aperture providing access to said adjusting screw and an upwardly extending releasable line guide mounted on said housing rearwardly of said spindle, whereby with said device mounted on a fishing pole and with a line extending through said guides and wrapped around said spindle a forward pull on the line will rotate said spindle and cause said ratchet to provide an audible signal, the adjustment of said adjustable guide determining the pull required to rotate said spindle.

3. An audible signal device for fishing poles, said device comprising an elongated base, said base having a longitudinally extending concave groove in the bottom providing a seat for a fishing pole, means to releasably secure said base to a fishing pole, an upwardly extending spindle rotatably mounted on said base intermediate the length thereof, ratchet teeth on said spindle adjacent the lower end, a leaf spring having one end fixed to said base and the opposite end engaging said teeth to provide a ratchet, an upwardly extending adjustable line guide mounted on said base forwardly of said spindle, said guide comprising spaced substantially parallel resilient strips having opposed arcuate portions for receiving a line and terminating at the upper ends in diverging portions to facilitate insertion of a line between said strips and said arcuate portions, a headed adjusting screw slidably received in an aperture in one strip and threadedly engaged in an aperture in the other strip and a compression spring disposed between the head of said screw and said one member, whereby adjustment of said screw will vary the frictional engagement of said strip with a line, a housing for said base and ratchet, said housing having apertures for receiving said spindle and guide, said housing having an aperture providing access to said adjusting screw and an upwardly extending releasable line guide mounted on said housing rearwardly of said spindle, whereby with said device mounted on a fishing pole and with a line extending through said guides and wrapped around said spindle a forward pull on the line will rotate said spindle and cause said ratchet to provide an audible signal, the adjustment of said adjustable guide determining the pull required to rotate said spindle.

4. An audible signal device for fishing poles, said device comprising an elongated base, means to releasably secure said base to a fishing pole, an upwardly extending spindle rotatably mounted on said base intermediate the length thereof, ratchet teeth on said spindle adjacent the lower end, a leaf spring having one end fixed to said base and the opposite end engaging said teeth to provide a ratchet, an upwardly extending adjustable line guide mounted on said base forwardly of said spindle, said guide comprising spaced substantially parallel resilient strips having opposed arcuate portions for receiving a line and terminating at the upper ends in diverging portions to facilitate insertion of a line between said strips and said arcuate portions, a headed adjusting screw slidably received in an aperture in one strip and threadedly engaged in an aperture in the other strip and a compression spring disposed between the head of said screw and said one member, whereby adjustment of said screw will vary the frictional engagement of said strips with a line, a housing for said base and ratchet, said housing having apertures for receiving said spindle and guide, said housing having an aperture providing access to said adjusting screw and an upwardly extending releasable line guide mounted on said housing rearwardly of said spindle, whereby with said device mounted on a fishing pole and with a line extending through said guides and wrapped around said spindle a forward pull on the line will rotate said spindle and cause said ratchet to provide an audible signal, the adjustment of said adjustable guide determining the pull required to rotate said spindle.

5. An audible signal device for fishing poles, said device comprising an elongated base, means to releasably secure said base to a fishing pole, an upwardly extending spindle rotatably mounted on said base intermediate the length thereof, ratchet teeth on said spindle, a leaf spring having one end fixed to said base and the opposite end engaging said teeth to provide a ratchet, an upwardly extending adjustable line guide mounted on said base forwardly of said spindle, said guide comprising spaced substantially parallel resilient strips having opposed arcuate portions for receiving a line and terminating at the upper ends in diverging portions to facilitate insertion of a line between said strips and said arcuate portions, a headed adjusting screw slidably received in an aperture in one strip and threadedly engaged in an aperture in the other strip and a compression spring disposed between the head of said screw and said one member, whereby adjustment of said screw will vary the frictional engagement of said strips with a line, a housing for said base and ratchet, said housing having apertures for receiving said spindle and guide, said housing having an aperture providing access to said adjusting screw and an upwardly extending releasable line guide mounted on said housing rearwardly of said spindle, whereby with said device mounted on a fishing pole and with a line extending through said guides and wrapped around said spindle a forward pull on the line will rotate said spindle and cause said ratchet to provide an audible signal, the adjustment of said adjustable guide determining the pull required to rotate said spindle.

6. An audible signal device for fishing poles, said device comprising an elongated base, means to releasably secure said base to a fishing pole, an upwardly extending spindle rotatably mounted on said base intermediate the length thereof, ratchet teeth on said spindle, a leaf spring having one end fixed to said base and the opposite end engaging said teeth to provide a ratchet, an upwardly extending adjustable line guide mounted on said base forwardly of said spindle, said guide comprising spaced substantially parallel resilient strips having opposed arcuate portions for receiving a line and terminating at the upper ends in diverging portions to facilitate insertion of a line between said strips and said arcuate portions, a headed adjusting screw slidably received in an aperture in one strip and threadedly engaged in an aperture in the other strip and a compression spring disposed between the head of said screw and said one member, whereby adjustment of said screw will vary the frictional engagement of said strips with a line, a housing for said base and ratchet, said housing having apertures for receiving said spindle and guide and said housing having an aperture providing access to said adjusting screw, whereby with said device mounted on a fishing pole and with a line extending through said guide and wrapped around said spindle a forward pull on the line will rotate said spindle and cause said ratchet to provide an audible signal, the adjustment of said adjustable guide determining the pull required to rotate said spindle.

7. An audible signal device for fishing poles, said device comprising an elongated base, means to releasably secure said base to a fishing pole, an upwardly extending spindle rotatably mounted on said base intermediate the length thereof, ratchet teeth on said spindle, a leaf spring having one end fixed to said base and the opposite end engaging said teeth to provide a ratchet, an upwardly extending adjustable line guide mounted on said base forwardly of said spindle, said guide comprising spaced substantially parallel resilient strips having opposed arcuate portions for receiving a line, and terminating at the upper ends in diverging portions to facilitate insertion of a line between said strips and said arcuate portions, means to vary the frictional engagement of said strips with a line, a housing for said base and ratchet and said housing having apertures for receiving said spindle and guide, whereby with said device mounted on a fishing pole and with a line extending through said guide and wrapped around said spindle a forward pull on the line will rotate said spindle to cause said ratchet to provide an audible signal, the adjustment of said adjustable guide determining the pull required to rotate said spindle.

8. An audible signal device for fishing poles, said device comprising an elongated base, means to releasably secure said base to a fishing pole, an upwardly extending spindle rotatably mounted on said base intermediate the length thereof, ratchet teeth on said spindle, means engaging said teeth to provide a ratchet, an upwardly extending adjustable line guide mounted on said base forwardly of said spindle, means to vary the frictional engagement of said guide with a line, a housing for said base and ratchet and said housing having apertures for receiving said spindle and guide, whereby with said device mounted on a fishing pole and with a line extending through said guide and wrapped around said spindle a forward pull on the line will rotate said spindle and cause said ratchet to provide an audible signal, the adjustment of said adjustable guide determining the pull required to rotate said spindle.

9. An audible signal device for fishing poles, said device comprising an elongated base, means to releasably secure said base to a fishing pole, an upwardly extending spindle rotatably mounted on said base intermediate the length thereof, ratchet teeth on said spindle, means engaging said teeth to provide a ratchet, a housing for said base and ratchet and said housing having an aperture for receiving said spindle, whereby with said device mounted on a fishing pole and with a line wrapped around said spindle a forward pull on the line will rotate said spindle and cause said ratchet to provide an audible signal.

References Cited in the file of this patent

UNITED STATES PATENTS

| | | |
|---|---|---|
| 1,693,140 | Dietze | Nov. 27, 1928 |
| 2,680,842 | Opphile | June 8, 1954 |

FOREIGN PATENTS

| | | |
|---|---|---|
| 1,060,115 | France | Nov. 18, 1953 |